United States Patent
Goering et al.

(10) Patent No.: US 7,308,267 B2
(45) Date of Patent: Dec. 11, 2007

(54) WIRELESS DIRECT ROUTING SERVICE

(75) Inventors: Scott Christopher Goering, Naperville, IL (US); Audrey Chow, Gurnee, IL (US); Dianna Inara Tiliks, Palatine, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 486 days.

(21) Appl. No.: 10/638,318

(22) Filed: Aug. 12, 2003

(65) Prior Publication Data

US 2005/0037750 A1    Feb. 17, 2005

(51) Int. Cl.
*H04Q 7/20* (2006.01)

(52) U.S. Cl. ............... 455/445; 455/426.1; 455/426.2; 455/432.1; 455/432.2; 379/219; 379/220.01; 379/221.01; 379/221.02; 379/221.08; 379/221.09; 379/221.1

(58) Field of Classification Search ............. 455/426.1, 455/428, 445, 553.1, 552.1, 554.2, 554.1, 455/417, 426.2, 432.1, 432.2; 379/221.04, 379/220.01, 221.01, 221.09, 221.14, 201.01, 379/219, 221.02, 221.05, 221.07, 221.08, 379/221.1, 221.12, 222, 224, 229, 220.1

See application file for complete search history.

(56) References Cited

U.S. PATENT DOCUMENTS

| | | | | |
|---|---|---|---|---|
| 4,972,464 A * | 11/1990 | Webb et al. | ............ | 379/114.02 |
| 5,519,760 A * | 5/1996 | Borkowski et al. | ....... | 455/404.2 |
| 5,557,664 A * | 9/1996 | Burns et al. | ........... | 379/127.05 |
| 5,572,579 A * | 11/1996 | Orriss et al. | ........... | 379/142.01 |
| 5,901,359 A * | 5/1999 | Malmstrom | ................. | 455/461 |
| 5,920,820 A | 7/1999 | Qureshi et al. | | |
| 5,956,394 A * | 9/1999 | Andruska et al. | ...... | 379/201.01 |
| 5,982,869 A * | 11/1999 | Lozano et al. | ......... | 379/220.01 |
| 6,014,377 A | 1/2000 | Gillespie | | |
| 6,259,782 B1 | 7/2001 | Gallant | | |
| 6,263,056 B1 * | 7/2001 | Gruchala et al. | ...... | 379/114.01 |
| 6,356,756 B1 | 3/2002 | Koster | | |
| 6,449,474 B1 * | 9/2002 | Mukherjee et al. | ...... | 455/414.2 |
| 6,487,412 B1 * | 11/2002 | Brennan et al. | ............ | 455/445 |
| 6,505,050 B1 * | 1/2003 | Brudos et al. | .............. | 455/458 |
| 6,757,538 B1 * | 6/2004 | Howe | ........................ | 455/445 |
| 6,807,267 B2 * | 10/2004 | Moss et al. | ............ | 379/207.15 |
| 6,847,824 B1 * | 1/2005 | Contractor | ............... | 455/456.1 |
| 7,035,645 B2 * | 4/2006 | Hitzeman | .................... | 455/453 |
| 7,054,636 B1 * | 5/2006 | Howe | ......................... | 455/445 |
| 7,155,220 B2 * | 12/2006 | Hazelwood | ................. | 455/433 |
| 7,190,780 B2 * | 3/2007 | Madoch et al. | ........ | 379/221.15 |

(Continued)

*Primary Examiner*—Joseph Feild
*Assistant Examiner*—Olumide Ajibade-Akonai
(74) *Attorney, Agent, or Firm*—Greenblum & Bernstein, P.L.C.

(57) ABSTRACT

A call is routed to a wireless mobile station from a wireline network while bypassing a host mobile switching center (MSC) of the mobile station when the mobile station is registered at an MSC other than the host MSC. In particular, a service control point (SCP) in the wireline network receives a query from a tandem switch, associated with a trunk group of the host MSC, in response to an attempted termination of the call at the trunk group. Based on information from the query, the SCP retrieves registration data from a home location register of the host MSC, using IS-41 signaling. When the registration data indicates that the mobile station is registered at the alternate MSC, the SCP instructs the tandem switch to route the call directly to a trunk group of the alternate MSC, i.e., without passing through the host MSC.

23 Claims, 6 Drawing Sheets

U.S. PATENT DOCUMENTS

| | | | |
|---|---|---|---|
| 2002/0099854 A1* | 7/2002 | Jorgensen | 709/249 |
| 2004/0005891 A1* | 1/2004 | Yu et al. | 455/428 |
| 2004/0067755 A1* | 4/2004 | Sylvain | 455/445 |
| 2004/0114747 A1* | 6/2004 | Trandal et al. | 379/211.02 |
| 2004/0248570 A1* | 12/2004 | Denenberg et al. | 455/432.3 |
| 2005/0250501 A1* | 11/2005 | Mobin et al. | 455/445 |

* cited by examiner

WIRELESS DIRECT ROUTING SERVICE

BACKGROUND OF THE INVENTION

1. Field of the Invention

The present invention relates to the field of telecommunications. More particularly, the present invention relates to routing of calls to a wireless network through an advanced intelligent network (AIN) network.

2. Acronyms

The written description contains acronyms that refer to various telecommunications services, components and techniques, as well as features relating to the present invention. Although some of these acronyms are known, use of these acronyms is not strictly standardized in the art. For purposes of the written description, the acronyms are defined as follows:

- Advanced Intelligent Network (AIN)
- Advanced Mobile Phone Service (AMPS)
- Carrier Advanced Intelligent Network (CAIN)
- Code Division Multiple Access (CDMA)
- Direct Sequence Code Division Multiple Access (DS-CDMA)
- Dual Tone Multi-Frequency (DTMF)
- Electronic Key Telephone System (EKTS)
- Global System for Mobile Communications (GSM)
- Home Location Register (HLR)
- Local Access and Transport Area (LATA)
- Metropolitan Trading Area (MTA)
- Mobile Identification Number (MIN)
- Mobile Switching Center (MSC)
- Mobile Telephone Switching Center (MTSC)
- Personal Digital Assistant (PDA)
- Personal Identification Number (PIN)
- Plain Old Telephone Service (POTS)
- Public Switched Telephone Network (PSTN)
- Service Control Point (SCP)
- Service Switching Point (SSP)
- Signaling System 7 (SS7)
- Signaling Transfer Point (STP)
- Temporary Location Destination Number (TLDN)
- Time Division Multiple Access (TDMA)
- Trunk Group Trigger (TGT)

3. Background Information

Wireless devices, such as cellular telephones and personal digital assistants (PDA), have enabled mobile users to roam over large geographic areas while maintaining immediate access to telephony services. Wireless communication systems typically provide service to a geographic market area by dividing the area into many smaller areas called cells. Each cell is serviced by a base station, which receives and transmits on predetermined telecommunication radio frequencies, as directed by its associated controller. The cell sites connect to a mobile switching center (MSC), through land lines or other communication links. Each MSC is likewise connected to the public switched telephone network (PSTN), to enable communications between wireline and wireless parties.

Figure 1:
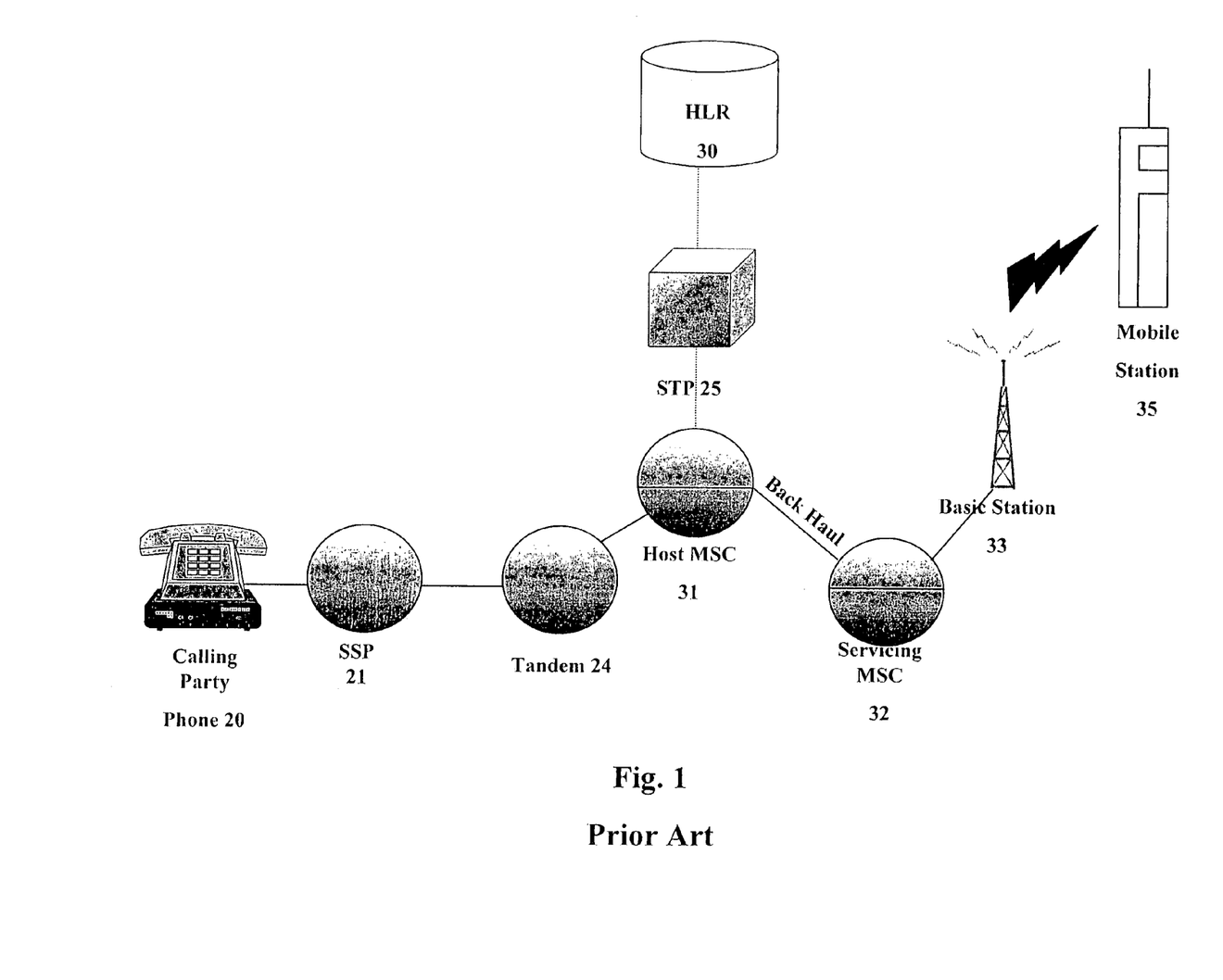
FIG. 1 is a prior art architecture block diagram showing an exemplary conventional telecommunications network, including wireline and wireless networks.

The conventional method of connecting wireless and wireline networks is generally outlined below in reference to FIG. 1. An exemplary call is initiated at the calling party telephone 20 and routed from an originating end office switch, such as a service switching point (SSP) 21, to a tandem switch 24. A host MSC 31 receives the call from a tandem switch 24, deciphers the directory number and queries the home location register (HLR) 30, through a signaling transfer point (STP) 25, for example, to retrieve data indicating the current status of a mobile station 35. The data includes the identity of the MSC and/or trunk group at which the mobile station is currently registered based on the location of the mobile station 35. The HLR 30 is a database relating to mobile stations in the wireless network (e.g., based on the common NPA/NXX and/or carrier), including the mobile stations assigned to the MSC 31. When the MSC servicing the mobile station 35 is not the host MSC 31, such as servicing MSC 32, the MSC 31 routes the call to the servicing MSC 32 through a back haul facility. The servicing MSC 32 then completes the call to the mobile station 35 utilizing the appropriate wireless communications network elements, such as the base station servicing the cell in which the mobile station 35 is located, indicated by a base station 33.

The use of back haul facilities is inefficient and expensive. It increases routing and trunk group administration complexity, as well as traffic load on the MSCs. For example, in addition to handling calls to mobile stations currently located in its geographic area, the host MSC 31 must continue to handle all calls to each mobile station that it hosts (e.g., based on the corresponding NPA/NXX), regardless of where the mobile station is located. The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to efficiently routing calls from a wireline network, such as the PSTN, to a mobile station in a wireless network, using AIN capabilities in the PSTN to identify the trunk group associated with a mobile switching center (MSC), or a mobile telephone switching center (MTSC), at which the mobile station is presently registered, to avoid utilizing back haul facilities. The routing includes use of a newly developed AIN trigger, known as a terminating attempt trunk group trigger (TGT), launched by the tandem switch of the trunk group associated with the mobile station's host MSC. Furthermore, the invention relates to routing calls to mobile units roaming outside the local access and transport area (LATA) and/or metropolitan trading area (MTA) of the mobile station's host MSC directly to an interexchange (IXC) switch, in order to access the other LATA and/or MTA, using AIN capabilities in the PSTN.

In view of the above, the present invention, through one or more of its various aspects and/or embodiments, is presented to accomplish one or more objectives and advantages, such as those noted below.

An aspect of the present invention provides a method to reduce the number of MSC ports required to process calls and to reduce back haul facilities between the MSCs.

Another aspect of the present invention provides a method for routing a call to a wireless number, associated with an MSC, through a wireline network. The method includes determining routing data for the call, based on data retrieved from the host MSC, in response to a query initiated by a switch in association with a trunk group of the host MSC. The query may include a trunk group trigger (TGT), launched by the switch, which corresponds to a query including at least the wireless number and identification of the trunk group. The call is routed from the switch to an alternate location when required, without routing through the host MSC. The alternate location may be associated with an alternate number, including a trunk group number of an alternate MSC or an IXC carrier. Also, the routing data may be determined based on a geographic location of a wireless device, corresponding to the wireless number.

Another aspect of the present invention provides a method for routing a call through a wireline network to a mobile station in a wireless network, which includes at least a host MSC corresponding to a directory number of the mobile device. The method includes suspending the call at a switch associated with a trunk group of the host MSC; receiving a query from the switch, including the directory number; retrieving registration data of the directory number from a database associated with the host MSC, based on at least the directory number; and identifying a servicing MSC based on the registration data. The registration data may include a trunk group number or a routing index of the servicing MSC. The registration data may include location data, indicating a location of the mobile station, such that the method further includes translating the location data into one of a trunk group number and a routing index of the servicing MSC.

When the servicing MSC is not the host MSC, the call is routed from the switch to the servicing MSC without passing through the host MSC. When the servicing MSC is in a second LATA, different from a first LATA associated with the host MSC, the call is routed from the switch to an interexchange carrier, capable of accessing the second LATA, without passing through the host MSC. When the servicing MSC is in a second MTA, different from a first MTA associated with the host MSC, the call is routed from the switch to an interexchange carrier, capable of accessing the second MTA, without passing through the host MSC. Also, retrieving registration data may include sending an IS-41 protocol query via a signaling network to the database associated with the host MSC, and receiving the registration data via the signaling network in response to the query.

Another aspect of the present invention provides a method for routing a call to a wireless device through a wireline network, the wireless device having a wireless number associated with a host MSC located in a first LATA, the wireless device being serviced by an alternate MSC located in a second LATA. The method includes determining routing data for the call, based on data retrieved from a location register of the host MSC, in response to a query initiated by a switch, associated with a trunk group of the host MSC, in response to the call. The routing data includes at least identification of an alternate trunk group of the alternate MSC and an interexchange switch of the second LATA. Also, the query may be based on TGT launched by the switch, the query including at least the wireless number and identification of the trunk group. The call is routed from the trunk group switch to an interexchange switch of the first LATA, without routing through the host MSC, in response to the routing data indicating the interexchange switch of the second LATA. The alternate trunk group may be determined based on a geographic location of the wireless device. Further, the routing data may be passed to the first LATA interexchange switch and the second LATA interexchange switch, and the call may be routed from the first LATA interexchange switch to the second LATA interexchange switch, identified by the routing data. The call is then routed from the second LATA interexchange switch to the alternate trunk group, identified by the routing data.

Another aspect of the present invention provides a system for routing a call through a wireline network to a wireless device in a wireless network, the wireless device having an associated wireless directory number. The system includes a host MSC in the wireless network and a service control point (SCP) in the wireline network. The host MSC is associated with the wireless directory number and includes a location register, which includes registration data identifying a servicing MSC currently associated with the wireless directory number. The servicing MSC is determined by at least a location of the wireless device. The SCP receives a query from a tandem switch associated with a trunk group of the host MSC in response to the call to the wireless device, retrieves the registration data from the location register, and instructs the tandem switch to route the call to the servicing MSC based on the registration data. When the servicing MSC is not the host MSC, the SCP instructs the tandem switch to route the call to the servicing MSC without passing through the host MSC. The query received from the tandem switch may include a trunk group trigger, including at least the wireless directory number.

The system for routing the call may further include first and second interexchange switches. The first interexchange switch, located in a first LATA, includes the host MSC. The second interexchange switch, located in a second LATA, includes the servicing MSC. The registration data further identifies the second interexchange switch. The SCP accordingly instructs the tandem switch to route the call to the servicing MSC by first routing the call through the first interexchange switch, without passing through the host MSC.

Another aspect of the present invention provides a system for routing a call, through a PSTN, to a wireless device having an associated directory number. The system includes multiple MSCs, each of which corresponds to a geographic coverage area. The wireless device is assigned to a host MSC of the MSCs based on at least a portion of the directory number. The system further includes at least one location register, which includes registration data identifying one MSCs which corresponds to the geographic coverage area in which the wireless device is currently located. The host MSC retrieves the registration data from the at least one location register and sends the registration data to an SCP in the PSTN, in response to a query from the SCP. The query from the SCP is triggered by the call to the wireless device.

The SCP instructs a tandem switch, associated with the host MSC, to route the call to the MSC identified by the registration data, without routing the call through the host MSC, when the MSC is not the host MSC.

Yet another aspect of the present invention provides computer data signaling, embodied on a propagation medium, that processes a call in a wireless network and a wireline network. The wireless network includes a first MSC associated with a mobile station, and the wireline network includes an SCP and a tandem switch corresponding to a first trunk group of the first MSC. The computer data signaling includes a first query signal, between the tandem switch and the SCP, including at least a trunk group number associated with the first trunk group and a directory number of the mobile station, and a second query signal, between the SCP and the first MSC, including a request for location data of the mobile station. The first MSC retrieves the location data from a database, based on the directory number, and forwards the location data to the SCP. The first query signal may be triggered by a TGT, associated with the first trunk group, when the first tandem switch detects an attempted termination of the call to the directory number through the first MSC. The second query signal may include IS-41 signaling.

The computer data signaling further includes a routing signal, between the SCP and the tandem switch, including at least one of an identification of a second MSC or a second trunk group of the second MSC, when the location data indicates that the mobile station is positioned in an area serviced by the second MSC. The location data may include a trunk group number associated with the second trunk group. Also, the location data may include a set of coordinates corresponding to the position of the mobile station. The first tandem switch routes the call to the second MSC, without routing the call through the first MSC, in response to the routing signal.

The various aspects and embodiments of the present invention are described in detail below.

Figure 2:
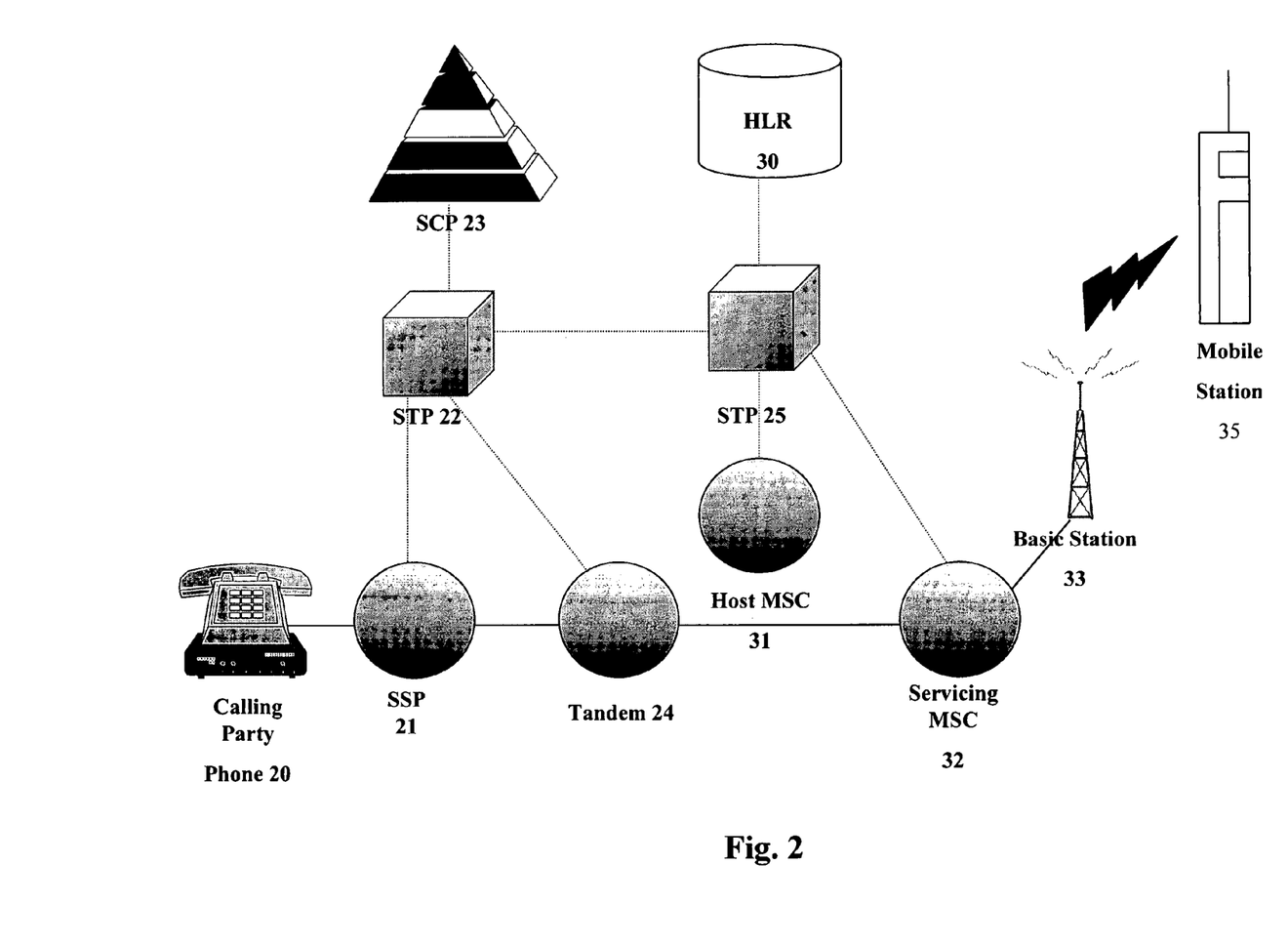
FIG. 2 is a block diagram showing exemplary architecture of a telecommunications network, including wireline and wireless networks, according to an aspect of the present invention.

FIG. 2 illustrates an exemplary telecommunications network of the present invention. The telecommunications network includes a wireline network or PSTN, including an outside party telephone 20, an SSP 21 and a tandem switch 24. The outside party telephone 20 may be any type of PSTN compatible telephone, including a plain old telephone service (POTS) telephone, or a telephone in a Centrex system, a PBX system or an electronic key telephone system (EKTS). The calling party telephone 20 may also be dual tone multiple frequency (DTMF) capable, although it is not necessary.

The SSP 21 is an end office switch servicing the calling party telephone 20. The SSP 21 may include, for example, 1AESS or 5ESS switches manufactured by Lucent Technologies, Inc. (Lucent); DMS-100 or DMS-250 switches manufactured by Nortel Networks Corporation (Nortel); AXE-10 switches manufactured by Telefonaktiebolaget LM Ericsson, or EWSD switches available from Siemens Information and Communication Networks, Inc. The tandem switch 24 is a conventional tandem switch servicing a trunk group associated with the host MSC 31. The tandem switch 24 is capable of recognizing AIN triggers, including triggers associated with calling and called party numbers and trunk groups. The tandem switch 24 may include, for example, 4ESS or 5ESS switches manufactured by Lucent, or DMS-200 switches manufactured by Nortel. The switches may utilize any enabling software compatible with AIN signaling, such as an AIN Release protocol or Carrier AIN (CAIN). However, embodiments of the present invention may include switches and routers used to carry ATM or IP traffic.

The wireline network portion of the exemplary telecommunications network of FIG. 2 also includes an STP 22, an STP 25 and a service control point (SCP) 23, capable of communicating with one another, and with the SSP 21 and the tandem switch 24, using out-of-band signaling, such as signaling system 7 (SS7). Although the invention is described in terms of SS7 signaling, it is understood that any comparable signaling transport may be incorporated in the invention, such as X.25 or IP. The out-of-band signaling connections are indicated by dashed lines in FIG. 2. By way of example, the SCP 23 is implemented with the Telcordia Integrated Service Control Point (ISCP) Current Generation Platform; the ISCP Next Generation Platform; the Lucent Advantage Service Control Point (LSCP) and Service Package Application (SPA); or the Telcordia Integrated Service Control Point (ISCP), loaded with ISCP software, available from Telcordia, Murray Hill, N.J.

The SCP 23 includes databases (not pictured) containing information relating to routing calls to the various MSCs in the wireless network, such as the host MSC 31 and the servicing MSC 32, discussed below. The databases may be internal or external to the SCP 23 and may include a table format. The SCP 23 interfaces with external databases through any compatible protocol, such as SR-3389 or SR-3511. The call flow logic of the present invention may be upgraded to accommodate future AIN releases and protocols and future trigger types, as well as the TGT of the present invention.

The telecommunications network also includes a wireless network, including the host MSC 31, the servicing MSC 32 and an HLR 30, associated with at least the host MSC 31. The host MSC 31 and the servicing MSC 32 are essentially exchanges that control the switching between the PSTN and the wireless network to enable communications between wireline telephones (e.g., the calling party telephone 20) and mobile stations (e.g., the mobile station 35). The MSCs 31 and 32 may be, for example, Alcatel 1000 MSC switches manufactured by Compagnie Financière Alcatel (Alcatel); 5ESS-2000 switches manufactured by Lucent; or DMS-MTX switches manufactured by Nortel. The HLR 30 may be, for example, an Alcatel 1422 HLR/Authentication Center manufactured by Alcatel.

Connected to the servicing MSC 32 is the base station 33, shown communicating via wireless transmissions with the mobile station 35. In other words, in the exemplary depiction of FIG. 2, the mobile station 35 is currently located in a cell associated with the base station 33. Although a single base station is depicted, it is understood that the servicing MSC 32, as well as the host MSC 31, is connected to and services multiple base stations or cell sites in the wireless network, and associated controllers. The number of base stations respectively serviced by the MSCs 31 and 32 is a function of the design of the wireless network. It is further understood that the base station 33 communicates with the mobile station 35 via any known wireless modulation and transmission techniques, including, for example, advanced mobile phone service (AMPS), code division multiple access (CDMA), direct sequence CDMA (DS-CDMA), cdma2000, IS-95, Global System for Mobile Communications (GSM), time division multiple access (TDMA), or the like.

As described above, the mobile station 35 is assigned to the host MSC 31 based on the NPA/NXX of the directory number and/or the wireless carrier of the mobile station 35.

The host MSC 31 may host a number of mobile stations, depending on various factors, including the number of customers, the identity of the carrier, the capacity of the host MSC 31, and the like. Because the host MSC 31 is associated with the mobile station 35, it maintains a record of service parameters relating to the mobile station 35 in the HLR 30. The service parameters may include, for example, the type of unit (e.g., cellular telephone, personal digital assistant (PDA), etc.), the make and model of the unit, the carrier, the mobile identification number (MIN), and registration data. When the HLR 30 is dedicated to a single carrier, there is no need to include the carrier data in association with the mobile station 35.

The registration data stored at the HLR 30 indicates the status of the mobile station 35, including whether the mobile station 35 is activated and, if so, where the mobile station 35 is located. The status of the mobile station 35 is provided automatically whenever it is turned ON through known signaling capabilities of the various types of wireless networks. The activation signaling enables the wireless network to essentially track the mobile station 35 as it moves throughout the network. When the mobile station is active and located in a cell corresponding to an MSC other than the host MSC 31, such as the servicing MSC 32, the HLR 30 records the identity of the servicing MSC 32.

Figure 3:
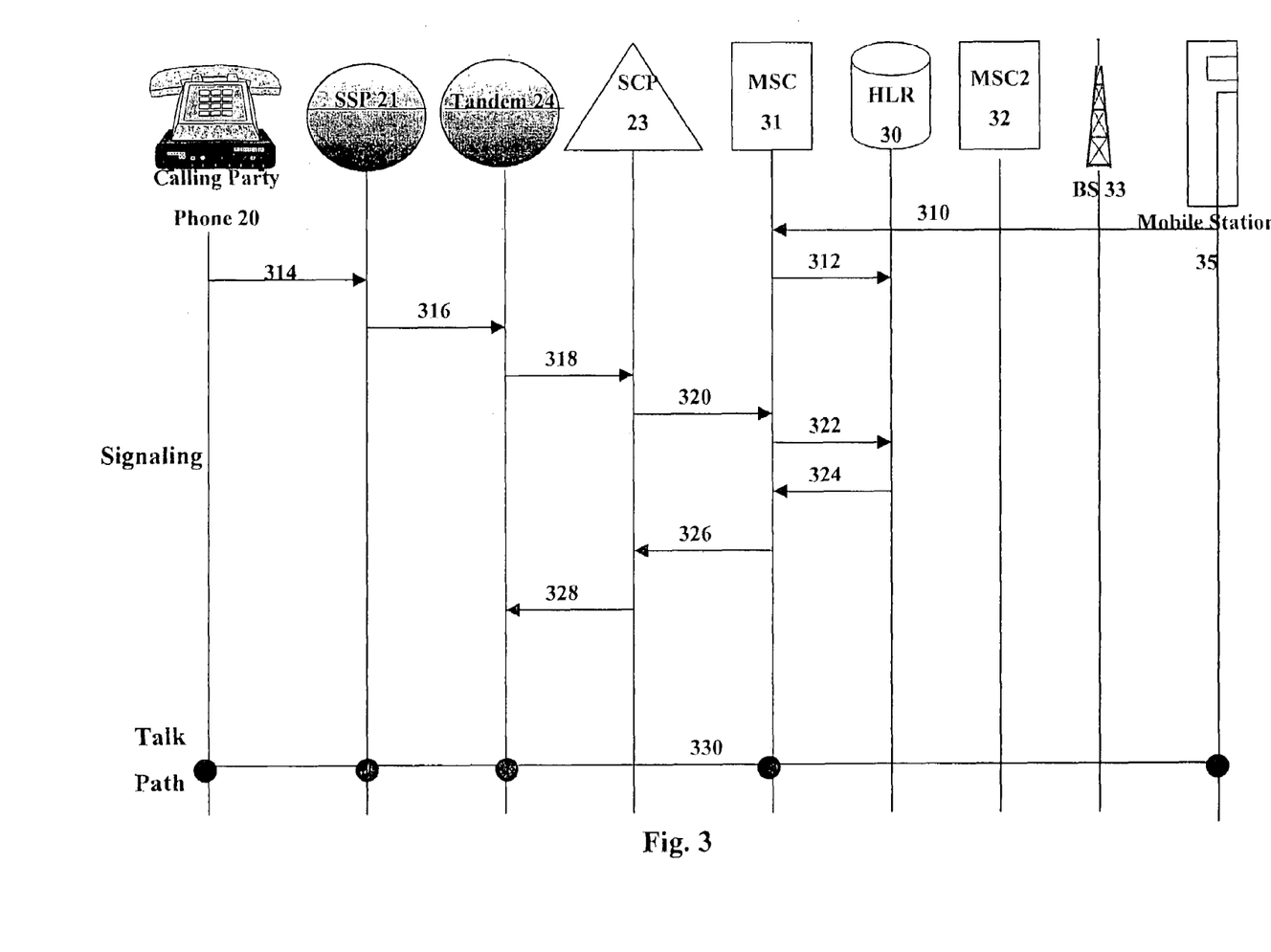
FIG. 3 is an exemplary call flow diagram showing routing of a telephone call to a mobile station registered at a host MSC, according to an aspect of the present invention.

The SCP 23 uses the registration data in the HLR 30 to route calls efficiently to the mobile station 35. FIG. 3 is an exemplary call flow diagram showing AIN routing of a call to the mobile station 35 when the mobile station 35 is registered at the host MSC 31. In particular, the mobile station 35 is turned ON in range of a base station (e.g., in a base station cell) connected to the host MSC 31 and accordingly sends activation signals to the host MSC 31 automatically at step 310. At step 312, the host MSC 31 notifies the HLR 30 that the mobile station 35 is registered at the host MSC 31. The HLR 30 stores the registration data accordingly.

A calling party subsequently initiates a call at the calling party telephone 20 by dialing the directory number of the mobile station 35. The call is initially routed to the originating SSP 21 at step 314, which routes the call to the tandem switch 24, typically through normal translations, at step 316. The SSP 21 may route the call directly to the tandem switch 24, or through any number of intervening end office and/or tandem switches, depending on the layout of the network. Also, the SSP 21 may route the call to the tandem switch 24 after initially querying the SCP 23 for instructions. For example, the calling party directory number, as well as the directory number of the mobile station 35, may trigger associated AIN services otherwise associated with the call. For instance, the calling party may subscribe to a Home Monitor service, such as the service described in U.S. patent application Ser. No. 09/983,303, filed Oct. 24, 2001, entitled "System and Method for Restricting and Monitoring Telephone Calls" in the names of Nancy A. Book et al., in which outgoing calls are blocked unless the caller successfully enters a bypass personal identification number (PIN). For purposes of subject exemplary call flow, when an AIN service is initially invoked, it is assumed that the SCP 23 instructs the SSP 21 to complete the call as dialed, resulting in forwarding the call to the tandem switch 24 at step 316, as discussed above.

The tandem switch 24 receives the call and, based on the called party number (i.e., the directory number of the mobile station 35), it launches a query in response to a TGT, via the SS7 network and the appropriate STP 22 (not pictured in FIG. 3), to the SCP 23 at step 318. The TGT query includes various known AIN parameters, used by the SCP 23 to process the query and provide appropriate routing instructions.

In an embodiment of the invention, the TGT query includes the called party number, the calling party number, the trunk group number and route index of the trunk group associated with the host MSC 31, an overflow route index and a billing number. The trunk group number is typically a five-digit number unique to the trunk group of the host MSC 31. The trunk group number is typically arbitrarily assigned by the switch associated with the trunk group, such as the tandem switch 24 associated with the trunk group of the MSC 31. The trunk group number also populates a table in the SCP 23, along with other trunk group numbers in the PSTN, indicating the correlation between the trunk group number and the MSC 31. The route index, which is a function of the NPA/NXX, indicates how to point or route traffic to the associated trunk group. The overflow route index indicates an alternative route when trunk groups of the primary route are busy or otherwise unavailable. The billing number provides the identity of the entity to be billed for the call (e.g., the called party, the calling party or a third party provider). The billing number may simply be the calling party number or the called party number, depending on the nature of the call and the billing criteria of the carrier.

Although the TGT and associated query has been described in terms of particular parameters, it is understood that the communication between the tandem switch 24 and the SCP 23 may be initiated by any mid-call AIN trigger that provides information sufficient for the SCP 23 to identify the host MSC 31 (or the trunk group corresponding to the MSC 31) as the MSC associated with the directory number of the mobile station 35, without limiting the scope or the spirit of the present invention.

The SCP 23 captures the query and identifies the call as a wireless call, based on the called party number and/or the trunk group number. The SCP 23 accordingly launches a query to the host MSC 31 at step 320, based on a previously stored association between the trunk group number (and/or the route index) and the host MSC 31, as discussed above. In an embodiment of the invention, the query launched by the SCP 23 is an IS-41 protocol-signaling query, sent through the SS7 network indicated by the dashed lines connecting the SCP 23, the STP 22, the STP 25, the host MSC 31 and the servicing MSC 32 in FIG. 2.

When the host MSC 31 receives the query via the STP 25 (not pictured in FIG. 3), it contacts the HLR 30 at step 322 to retrieve the registration data of the mobile station 35, based on the called party number. Alternatively, the registration data may be identified and retrieved based on the MIN or other identification number associated with the mobile station 35. Typically, the HLR 30 is associated with a number of MSCs in the wireless network, including the host MSC 31, based on the wireless carrier, although there may be crossover among wireless carriers. The HLR 30 looks up the registration data and sends it to the host MSC 31 at step 324. The communication between the host MSC 31 and the HLR 30 may include IS-41 protocol signaling through the SS7 network, as indicated by the dashed lines in FIG. 2. The host MSC 31 then answers the query of the SCP 23 by providing the registration data at step 326.

As stated above, the registration data returned to the SCP 23 generally indicates the location of the mobile station 35. In an embodiment of the invention, the registration data includes either (i) the original called party number (i.e., the directory number of the mobile station 35) or (ii) an alternate number identifying a trunk group (e.g., the trunk group number) of an alternate MSC at which the mobile station 35 is currently registered, such as the servicing MSC 32. In an alternative embodiment, any number that distinctly identifies the mobile station 35, or any number that identifies the host MSC 31 as the MSC servicing the area in which the mobile station 35 is located (e.g., the trunk group number of the host MSC 31), may be substituted for the original called party number without departing from the scope and spirit of the invention. Likewise, in an alternative embodiment, the alternate number may identify the alternate MSC by a number other than the alternate trunk group number, requiring the SCP 23 to look up the alternate trunk group number associated with the alternate MSC in an SCP table.

In the example depicted in FIG. 3, the registration data includes the original called party number. The SCP 23 therefore instructs the tandem switch 24 at step 328 to complete the call as dialed. In other words, the SCP 23 instructs the tandem switch to route the call to the host MSC 31. The host MSC 31 receives the call from the tandem switch 24 and sends the call to MSC 31 and onto the base station 33 that is currently servicing the mobile station 35. The selected base station pages or otherwise signals the mobile station 35 and transmits the call, using known wireless modulation and transmission techniques, to the mobile station 35 to complete the call. As indicated by step 330, which illustrates the talk path, when the user answers the call at the mobile station 35, the final route of the call includes the SSP 21, the tandem switch 24 and the host MSC 31.

Figure 4:
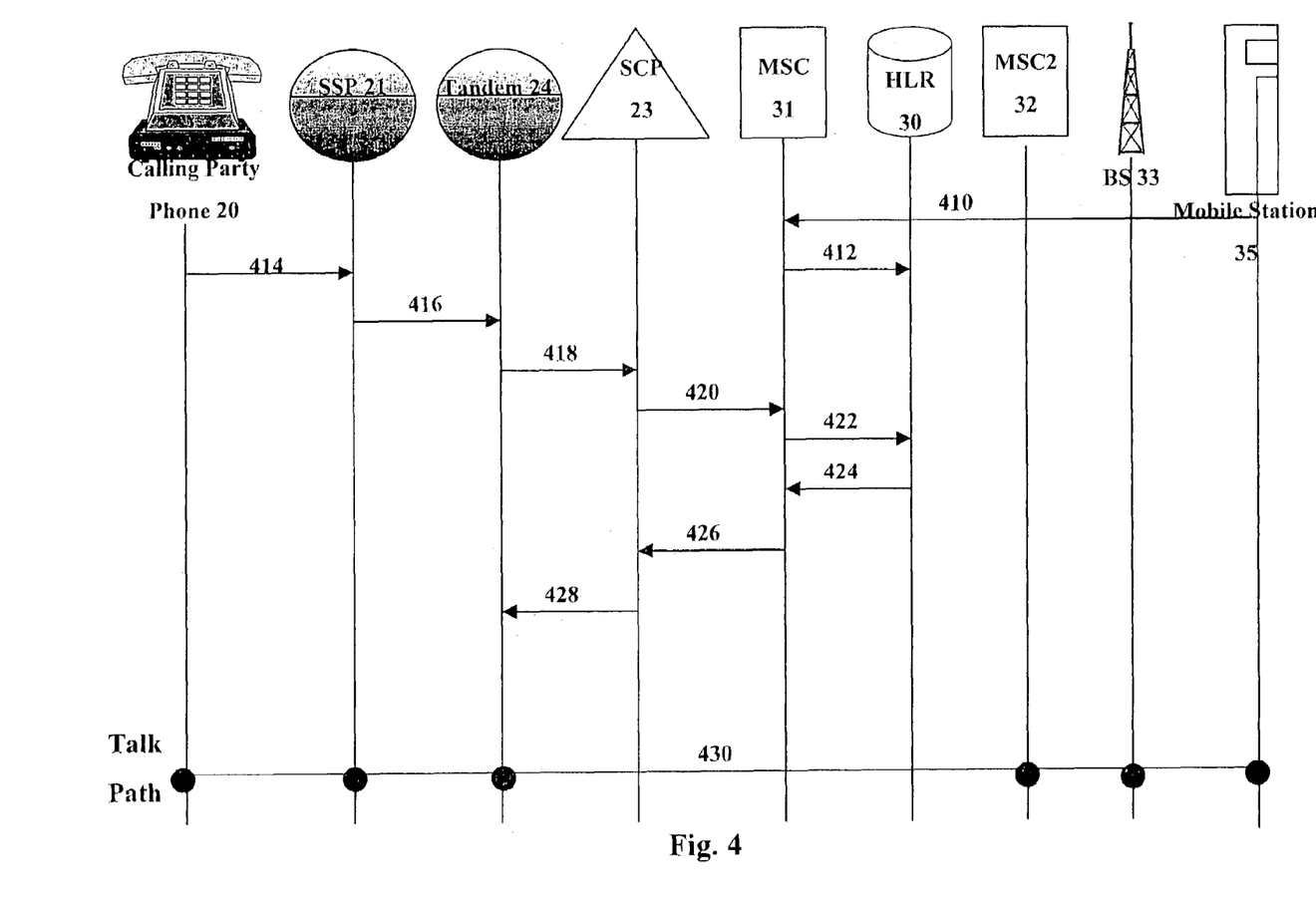
FIG. 4 is an exemplary call flow diagram showing routing of a telephone call to a mobile station registered at an MSC other than the host MSC, according to an aspect of the present invention.

In contrast to FIG. 3, FIG. 4 is an exemplary call flow diagram showing AIN routing of a call when the mobile station 35 is registered at an MSC other than the host MSC 31, such as the servicing MSC 32. The mobile station 35 is turned ON in range of a base station connected to the servicing MSC 32, such as the base station 33, depicted in FIG. 2. Activation signals are sent automatically from the mobile station 35 to the servicing MSC 32 at step 410, by way of the base station 33, as discussed above. At step 412, the servicing MSC 32 notifies the HLR 30 that the mobile station 35 is registered at the servicing MSC 32. The HLR 30 stores the registration data accordingly.

Steps 414 through 422 of FIG. 4 are essentially the same as steps 314 through 322 of FIG. 3, discussed above. Generally, a calling party initiates a call at the calling party telephone 20 by dialing the directory number of the mobile station 35. The call is routed to the originating SSP 21 at step 414, which ultimately routes the call to the tandem switch 24 at step 416, either through normal translations or based on instructions from the SCP 23. The tandem switch 24 receives the call and launches a TGT to the SCP 23 at step 418, including at least the calling party number, the called party number, the trunk group number and/or the route index.

The SCP 23 captures the query and identifies the MSC hosting the directory number of the mobile station 35 as the host MSC 31. The SCP 23 accordingly launches an IS-41 query to the host MSC 31 at step 420, based on the previously stored association between the host MSC 31 and at least one of the directory number, the trunk group number, and the route index. When the host MSC 31 receives the query, it contacts the HLR 30 at step 422 to retrieve the registration data of the mobile station 35.

At step 424, the HLR 30 looks up the registration data and sends it to the host MSC 31 at step 424, for example, using IS-41 protocol signaling through the SS7 network. In the example depicted in FIG. 4, the registration MSC 32, at which the mobile station 35 is currently registered. The host MSC 31 answers the query of the SCP 23 by providing the registration data at step 426.

As discussed above, the registration data includes an alternate number identifying the servicing MSC 32 and/or the alternate trunk group associated with the servicing MSC 32. Upon receipt of the alternate number, the SCP 23 instructs the tandem switch 24 at step 428 to route the alternate trunk group. When the alternate number identifies only the servicing MSC 32, the SCP 23 identifies the alternate trunk group associated with the servicing MSC 32 through previously stored relationships prior to sending instructions to the tandem switch 24. When alternate trunk and/or the servicing MSC 32 is located in another LATA or MTA, the SCP 23 instructs the tandem switch 24 to route the call to an interexchange switch of the other LATA or MTA, such as the IXC 41 of FIG. 6. The process of routing inter-LATA and inter-MTA calls in accordance with the present invention is discussed in detail with respect to FIGS. 5 and 6, below.

Significantly, upon receipt of routing instructions from the SCP 23, the tandem switch 24 routes the call to the trunk group associated with the servicing MSC 32 without first routing the call through the host MSC 31. The host MSC 31 therefore is not burdened by receiving the call and subsequently routing it to MSC 32 using a back haul facility. Therefore, ports on the host MSC 31, as well as ports on MSC 32 are not needlessly occupied by routing the call between the two.

Of course, routing from the tandem switch 24 to the trunk group associated with the servicing MSC 32 may be a direct connection or may include routing through any number of intervening switches, depending on the network layout, without departing from the scope and the spirit of the present invention. The servicing MSC 32 ultimately receives the call from the tandem switch 24, deciphers the directory number and alerts the base station 33 (not pictured in FIG. 4), which is determined to be currently servicing the mobile station 35. The base station 33 pages or otherwise signals the mobile station 35, for example, through a control channel associated with the base station 33. When the call is answered, base station 33 transmits the call to the mobile station 35 using known wireless modulation and transmission techniques to complete the call. As indicated by step 430, which is the talk path, the final route of the call includes the SSP 21, the tandem switch 24 and the servicing MSC 32.

Figure 5:
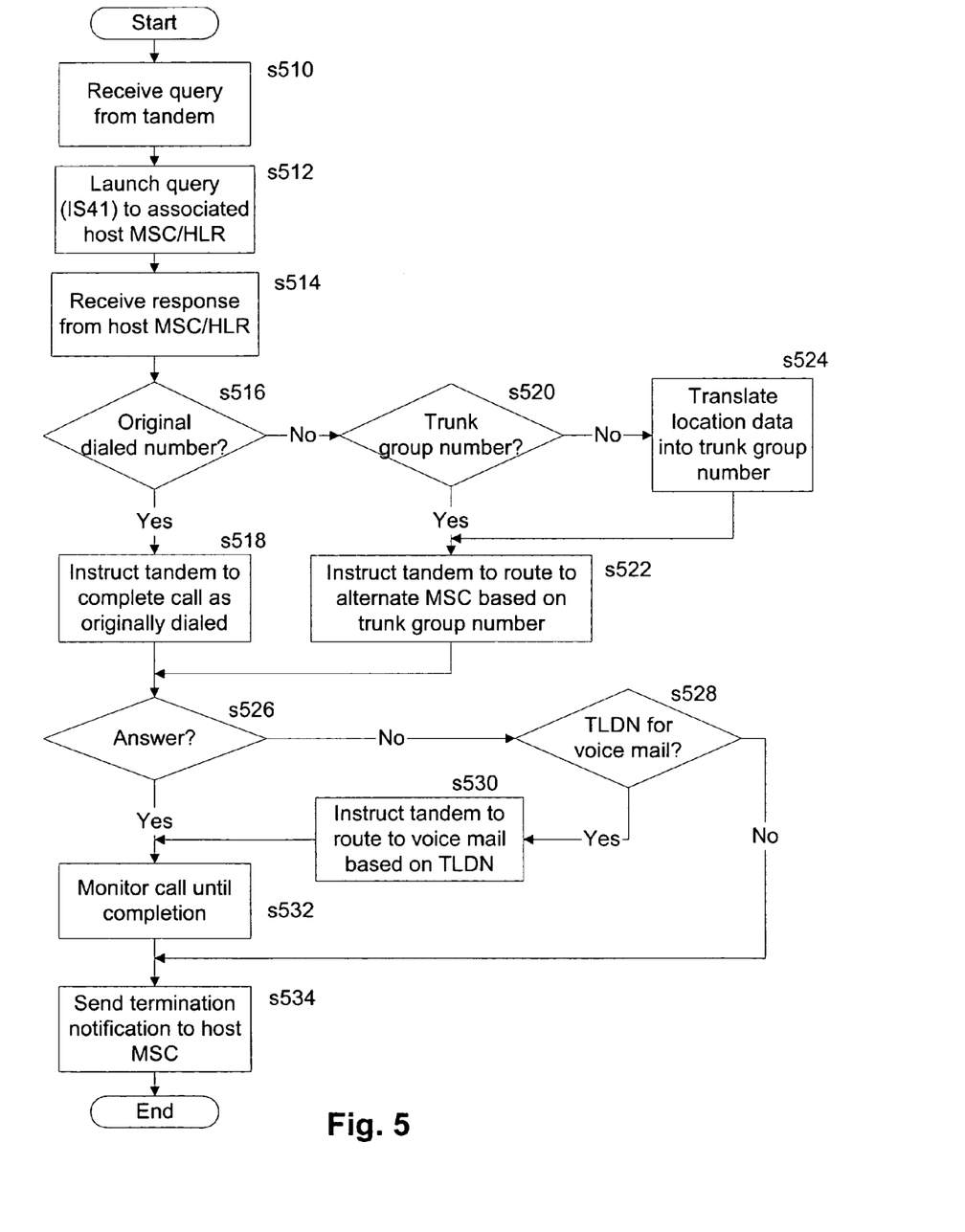
FIG. 5 is a logic flowchart of exemplary SCP service logic for routing a telephone call to a mobile station, based on registration status of the mobile station, according to an aspect of the present invention.

FIG. 5 is a flowchart of exemplary service logic of the SCP 23 for routing a telephone call to the mobile station 35, based on a registration status of the mobile station 35. At step s510, the SCP 23 receives a query over the SS7 signaling network from the tandem switch 24 based on a TGT, described above. Based on the trunk group number and/or the route index, the SCP 23 identifies the host MSC 31 as the MSC to which the mobile station 35 is assigned according to its NPA/NXX. At step s512, the SCP 23 launches an IS-41 query to the host MSC 31 over the SS7 signaling network, indicated by the dashed line between the STP 22 and the STP 25 in FIG. 2, requesting current registration data of the mobile station 35. The SCP 23 receives an IS-41 response to the query from the host MSC 31 at step s514, after the host MSC 31 retrieves the registration data from the HLR 30, as described above.

The SCP 23 determines the call routing based on the registration data, as indicated by steps s516, s520 and s524. The order of each determination made by the SCP 23, as well as the characterization of the inquiries, represents only one embodiment of the invention and is intended merely to simplify explanation of the invention, and is not intended to limit the scope or the spirit of the invention. At step s516, the SCP 23 determines whether the registration data includes the originally dialed number (i.e., the directory number of the mobile station 35). In alternative embodiments, the SCP 23 determines whether the registration data includes another identification number of the mobile station 35, such as the MIN, or the trunk group number of the host MSC 31. When the originally dialed number is included, the SCP 23 instructs the tandem switch 24 at step s518 to complete the call as originally dialed. In other words, the tandem switch 24 is instructed to route the call to the host MSC 31.

When the registration data does not include the originally dialed number, the SCP 23 determines whether the registration data includes an alternate number at step s520. When an alternate number is included, the SCP 23 translates the alternate number into an alternate trunk group number (unless the alternate number already is a trunk group number, as discussed above) and provides the trunk group number to the tandem switch 24, along with instructions to route the call to the alternate trunk group, at step s522. The SCP 23 or the tandem switch 24 may determine another tandem switch servicing the alternate trunk group number by translating the alternate trunk group number according to known translation techniques. As explained above, the alternate trunk group number and/or the alternate tandem switch are associated with the MSC at which the mobile station 35 is currently registered (e.g., the servicing MSC 32).

When the SCP 23 determines that registration data does not include an alternate number at step s520 enabling determination of an alternate trunk group number, it must determine the alternate trunk number based on the information provided by the registration data, in combination with available databases. For example, as indicated in step s524, the registration data may include location data relating to the current geographic position of the mobile station 35.

At step s524, the SCP 23 translates the location data retrieved from the host MSC 31 and the HLR 30 into a trunk group number. In an embodiment of the invention, the SCP 23 accesses a table indicating geographic service areas corresponding to servicing MSCs and/or trunk group numbers. The location data enables the SCP 23 to position the mobile station 35 within one of the service areas and accordingly identify the appropriate MSC and/or trunk group. When the SCP 23 only identifies the servicing MSC, it must additionally perform a look-up of the corresponding trunk group number to complete the translation. At step s522, the SCP 23 instructs the tandem switch 24 to route the call to an alternate MSC, such as the servicing MSC 32, in accordance with the alternate trunk group number identified at step s524.

Once the trunk group and/or servicing MSC has been identified, the tandem switch 24 routes the call accordingly, either directly to the host MSC 31 (i.e., the host MSC 31 is also currently servicing the mobile station 35) or directly to the tandem switch associated with an alternate MSC, such as the servicing MSC 32 (i.e., without passing through the host MSC 31). It is understood that the call may be routed from the tandem switch 24, through any number of intervening switches (other than the host MSC 31) to a switch associated with the alternate MSC, without departing from the scope and spirit of the invention.

An exception occurs when the servicing MSC 32 is located in a LATA or MTA different than that of the host MSC 31. For example, assume the location data translated in step s524 indicates a servicing MSC is located in a different LATA, such as LATA 2 shown in FIG. 6. In addition to determining the trunk group of the servicing MSC 32, the SCP 23 also determines the identity of an interexchange switch serving the LATA 2, such as IXC 41. The IXC switch 41 is identified by the SCP 23 in the same general manner in which the SCP 23 identifies the alternate MSC, discussed above. Alternatively, assume that the SCP 23 receives the identity of the IXC 41, along with the alternate number associated with the trunk group of the servicing MSC 32, from the host MSC 31/HLR 30 at step s520.

Figure 6:
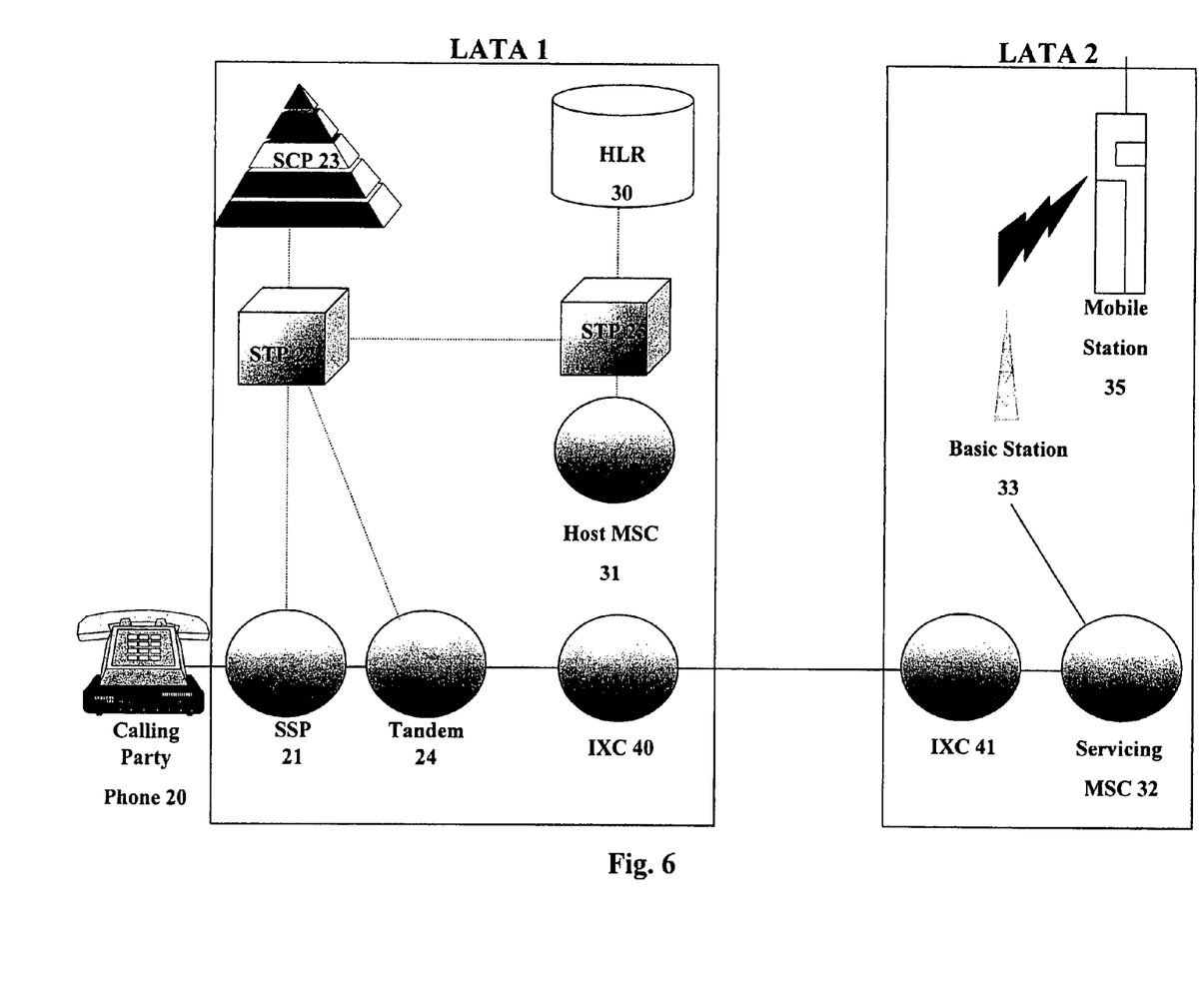
FIG. 6 is a block diagram showing an exemplary telecommunications network, including wire line and wireless networks in different an Intra-LATA configuration.

Once the SCP 23 has determined the trunk group and/or the interexchange switch information, it provides this information to the tandem switch 24, along with instructions to route the call to the IXC 41, at step s522. The tandem switch accordingly routes the call directly to the IXC 40 in LATA 1 (i.e., without passing through the host MSC 31), which routes the call to IXC 41 in LATA 2. The IXC 41, in turn, routes the call to the trunk group associated with the servicing MSC 32. In alternate embodiments of the invention, the IXC 40 receives the trunk group information from the tandem switch 24 or the SCP 23. The IXC 40 then sends this information to the IXC 41, enabling the IXC 41 to identify the trunk group and/or the servicing MSC 32 to which the call is to be routed. The same general routing process applies to calls that are inter-MTA, as opposed to inter-LATA.

Regardless of whether the call is inter-LATA or intra-LATA, the SCP 23 continues to monitor the call as it is routed to the appropriate MSC and, at step s526, determines whether the call is answered at the mobile station 35. When the call is answered, the SCP 23 continues to monitor the call until completion, as indicated by step s532. For example, the SCP 23 continues to monitor the call at the tandem switch 24 and sends the host MSC 31 notification upon a change of status over the out-of-band signaling network. When the call ends, the SCP 23 sends a termination notification message to the host MSC 31 via IS-41 signaling at step s534. The termination notification includes, for example, the elapsed time of the call.

The tandem switch 24 then records the call data records and/or the billing records associated with the call by known recording techniques. For example, the tandem switch 24 may record automatic message accounting (AMA) data or other well known call detail records for use by the appropriate carrier. With respect to inter-LATA calls, the AMA data may include a unique AMA sIpID for special processing by the appropriate interexchange carrier.

In an embodiment of the invention, the SCP 23 may determine that there is no answer at step s526. For example, there may be a predetermined number of rings or a busy signal or error indication. When there is no answer, the SCP 23 determines whether the response from the host MSC 31 and the HLR 30 at step s514 includes a temporary location destination number (TLDN) for voice mail associated with the mobile station 35. When a voice mail TLDN is not provided, the call simply terminates (e.g., continues to ring or indicate a busy status until terminated by the calling party by hanging up at the calling party telephone 20), at which point the SCP 23 sends a termination notification message to the host MSC 31 at step s534, indicating the information. When a voice mail TLDN is provided, the SCP 23 instructs the tandem switch 24 to interrupt the call and reroute to the voice mail TLDN at step s530. The voice mail TLDN likely indicates a directory number terminating within the wireline network, so routing the call to an alternate MSC would not be performed. However, as indicated by steps s532 and s534, the SCP 23 continues to monitor the call and sends the termination notification to the host MSC 31 upon completion of the voice mail interaction.

The present invention enhances the efficiency of routing calls to a wireless directory number through a wireline network by bypassing, at the trunk level, the host MSC 31 whenever the mobile station 35 is serviced by an alternate MSC. By bypassing the host MSC 31, the call is routed without having to back haul from the host MSC 31 to the tandem switch 24 in order to ultimately reach the alternate MSC. Rather, the tandem switch 24 is instructed by the SCP 23 to route to a tandem switch associated with the alternate MSC, or to an IXC switch when the alternate MSC is in another LATA or MTA, without passing through the host MSC 31. The instruction from the SCP 23 is enabled by the AIN TGT trigger, launched by the tandem switch 24 to the SCP 23 in response to an attempted call termination to the host MSC 31.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for wireless communications and public telephone networks (e.g., AIN, SS7, IS-41, AMPS, CDMA, DS-CDMA, cdma2000, IS-95, TDMA) represent examples of the state of the art. Such standards are periodically superseded by faster or more efficient equivalents having essentially the same functions. Accordingly, replacement standards and protocols having the same functions are considered equivalents.

What is claimed is:

1. A method for routing a call to a wireless number, associated with a host mobile switching center (MSC), through a wireline network, the method comprising:
routing the call from a first tandem switch to a second tandem switch, associated with a trunk group of the host MSC;
determining, by a service control point (SCP), routing data for the call, based on data retrieved from the host MSC, in response to a query initiated by the second tandem switch; and
routing the call from the second tandem switch to an alternate location when required, without routing through the host MSC, avoiding utilizing a backhaul facility.

2. The method for routing a call to the wireless number according to claim 1, in which the alternate location is associated with an alternate number comprising a trunk group number of an alternate MSC or an interexchange (IXC) switch.

3. The method for routing a call to a wireless number according to claim 1, in which the routing data is determined based on a geographic location of a wireless device, corresponding to the wireless number.

4. The method for routing a call to the wireless number according to claim 1, in which the query comprises a trunk group trigger launched by the second tandem switch, the trunk group trigger corresponding to a query comprising at least the wireless number and identification of the trunk group.

5. A method for routing a call through a wireline network to a mobile station in a wireless network, the wireless network including at least a host mobile switching center (MSC) corresponding to a directory number of the mobile station, the method comprising:
routing the call from a first tandem switch to a second tandem switch associated with a trunk group of the host MSC;
suspending the call at the second tandem switch;
receiving, by a service control point (SCP), a query from the second tandem switch, including the directory number;
in response to the query from the second tandem switch, retrieving registration data of the directory number from a database associated with the host MSC, based on at least the directory number;
identifying a servicing MSC based on the registration data; and
when the servicing MSC is not the host MSC, routing the call from the second tandem switch to the servicing MSC without passing through the host MSC, avoiding utilizing a backhaul facility associated with the host MSC.

6. The method for routing the call according to claim 5, further comprising, when the servicing MSC is in a second Local Access Transport Area (LATA), different from a first LATA associated with the host MSC, routing the call from the second tandem switch to an interexchange carrier, capable of accessing the second LATA, without passing through the host MSC.

7. The method for routing the call according to claim 5, further comprising, when the servicing MSC is in a second metropolitan trading area (MTA), different from a first MTA associated with the host MSC, routing the call from the second tandem switch to an interexchange carrier, capable of accessing the second MTA, without passing through the host MSC.

8. The method for routing the call according to claim 5, in which the registration data comprises one of a trunk group number and a routing index of the servicing MSC.

9. The method for routing the call according to claim 5, in which the registration data comprises location data, indicating a location of the mobile station, the method further comprising: translating the location data into one of a trunk group number and a routing index of the servicing MSC.

10. The method for routing the call according to claim 5, in which retrieving registration data comprises sending an IS-41 protocol query via a signaling network to the database associated with the host MSC, and receiving the registration data via the signaling network in response to the query.

11. A method for routing a call to a wireless device through a wireline network, the wireless device having a wireless number associated with a host mobile switching center (MSC) located in a first Local Access Transport Area (LATA), the wireless device being serviced by an alternate MSC located in a second LATA, the method comprising:
    determining routing data for the call, based on data retrieved from a location register of the host MSC, in response to a query initiated by a tandem switch, associated with a trunk group of the host MSC, in response to the call, the routing data comprising identification of an alternate trunk group of the alternate MSC and an interexchange switch of the second LATA; and
    routing the call from the tandem switch to an interexchange switch of the first LATA, without routing through the host MSC, based upon the routing data.

12. The method for routing a call to the wireless device according to claim 11, further comprising:
    passing the routing data to the first LATA interexchange switch and the second LATA interexchange switch;
    routing the call from the first LATA interexchange switch to the second LATA interexchange switch, identified by the routing data; and
    routing the call from the second LATA interexchange switch to the alternate trunk group, identified by the routing data.

13. The method for routing a call to the wireless device according to claim 11, in which the alternate trunk group is determined based on a geographic location of the wireless device.

14. The method for routing a call to the wireless device according to claim 11, in which the query is based on trunk group trigger launched by the tandem switch, the query comprising at least the wireless number and identification of the trunk group.

15. A system for routing a call through a wireline network to a wireless device in a wireless network, the wireless device having an associated wireless directory number, the system comprising:
    a host mobile switching center (MSC) in the wireless network, associated with the wireless directory number, the host MSC comprising a location register, which includes registration data identifying a servicing MSC currently associated with the wireless directory number, the servicing MSC being determined by at least a location of the wireless device; and
    a call processor in the wireline network that receives a query from a tandem switch associated with a trunk group of the host MSC in response to the call to the wireless device, retrieves the registration data from the location register, and instructs the tandem switch to route the call to the servicing MSC based on the registration data;
    wherein, when the servicing MSC is not the host MSC, the call processor instructs the tandem switch to route the call to the servicing MSC without passing through the host MSC, avoiding use of a backhaul facility.

16. The system for routing the call according to claim 15, in which the query received from the tandem switch comprises a trunk group trigger, the trunk group trigger including at least the wireless directory number.

17. The system for routing the call according to claim 15, further comprising:
    a first interexchange switch, located in a first local access transport area (LATA), which includes the host MSC; and
    a second interexchange switch, located in a second LATA, which includes the servicing MSC, the registration data further identifying the second interexchange switch;
    wherein the call processor instructs the tandem switch to route the call to the servicing MSC by first routing the call through the first interexchange switch, without passing through the host MSC.

18. A system for routing a call, through a public switched telephone network (PSTN), to a wireless device having an associated directory number, the system comprising:
    a plurality of mobile switching centers (MSCs), each MSC corresponding to a geographic coverage area, the wireless device being assigned to a host MSC of the plurality of MSCs based on at least a portion of the directory number; and
    at least one location register, which includes registration data identifying one of the plurality of MSCs which corresponds to the geographic coverage area in which the wireless device is currently located;
    wherein the host MSC retrieves the registration data from the at least one location register and sends the registration data to a service control point (SCP) in the PSTN, in response to a query from the SCP, the query from the SCP being triggered by the call to the wireless device; and
    wherein the SCP instructs a tandem switch, associated with the host MSC, to route the call to the one of the plurality of MSCs identified by the registration data, without routing the call through the host MSC, avoiding use of a backhaul facility, when the one of the plurality of MSCs is not the host MSC.

19. Computer data signaling, embodied on a propagation medium, that processes a call in a wireless network, comprising a first mobile switching center (MSC) associated with a mobile station, and a wireline network, comprising a service control point (SCP) and a tandem switch corresponding to a first trunk group of the first MSC, the computer data signaling comprising:
    a first query signal, between the tandem switch and the SCP, comprising at least one of a trunk group number associated with the first trunk group and a directory number of the mobile station;
    a second query signal, between the SCP and the first MSC, comprising a request for location data of the mobile station, the first MSC retrieving the location data from a database, based on the directory number, and forwarding the location data to the SCP; and
    a routing signal, between the SCP and the tandem switch, comprising an identification of a second MSC and a second trunk group of the second MSC, when the location data indicates that the mobile station is positioned in an area serviced by the second MSC, the first tandem switch routing the call to the second MSC, without routing the call through the first MSC, in response to the routing signal.

20. The computer data signaling according to claim 19, in which the first query signal is triggered by a trunk group trigger, associated with the first trunk group, when the first tandem switch detects an attempted termination of the call to the directory number through the first MSC.

21. The computer data signaling according to claim 20, in which the second query signal comprises IS-41 signaling.

22. The computer data signaling according to claim 19, in which the location data comprises a trunk group number associated with the second trunk group.

23. The computer data signaling according to claim 19, in which the location data comprises a set of coordinates corresponding to the position of the mobile station.

\* \* \* \* \*